May 24, 1960  K. LANCASTER  2,937,671
CONTROL DEVICE FOR LIQUID DISPENSING AND
WITHDRAWING APPARATUS
Filed Jan. 19, 1959  3 Sheets-Sheet 1

INVENTOR
Keith Lancaster
BY Alex. E. MacRae
ATTORNEY

United States Patent Office 2,937,671
Patented May 24, 1960

2,937,671

CONTROL DEVICE FOR LIQUID DISPENSING AND WITHDRAWING APPARATUS

Keith Lancaster, 412 McNab Ave., Renfrew, Ontario, Canada

Filed Jan. 19, 1959, Serial No. 787,456

3 Claims. (Cl. 141—119)

This invention relates to a control means for an apparatus for dispensing and withdrawing liquid.

In the dispensing of liquids, it is sometimes necessary, as in the delivery of fuel under pressure to aircraft, to provide means for withdrawal of the liquid in the supply lines. Such means may include a vacuum tank which becomes vacuumized in response to the dispensing operation and which provides suction for subsequent withdrawal of liquid in the supply lines. An example of one such apparatus in disclosed in United States Patent 2,747,783, J. A. Wooldridge, May 29, 1956.

It is an object of this invention to provide a control means for an apparatus for dispensing and withdrawing liquid utilizing a vacuum tank whereby the dispensing and withdrawing operations may be conducted in a simple, positive, and rapid manner.

The invention resides in a control device for liquid dispensing and withdrawing apparatus having a liquid supply passage, a vacuum tank, a main valve in said passage, and liquid flow-operated means for producing a vacuum in said tank, which comprises a reciprocally mounted rod connected to said main valve and operable to open and close said valve, a pressure responsive member connected to said rod for imparting reciprocal movement thereto, a housing for said pressure responsive member and means providing a differential pressure on opposite sides of said pressure responsive member comprising conduits for supplying atmospheric air to said housing on each side of said pressure responsive member, conduits connecting said housing on each side of said pressure responsive member to said vacuum tank, valves controlling flow through said conduits and means responsive to vacuum in said vacuum tank for actuating said valves.

Figure 1:
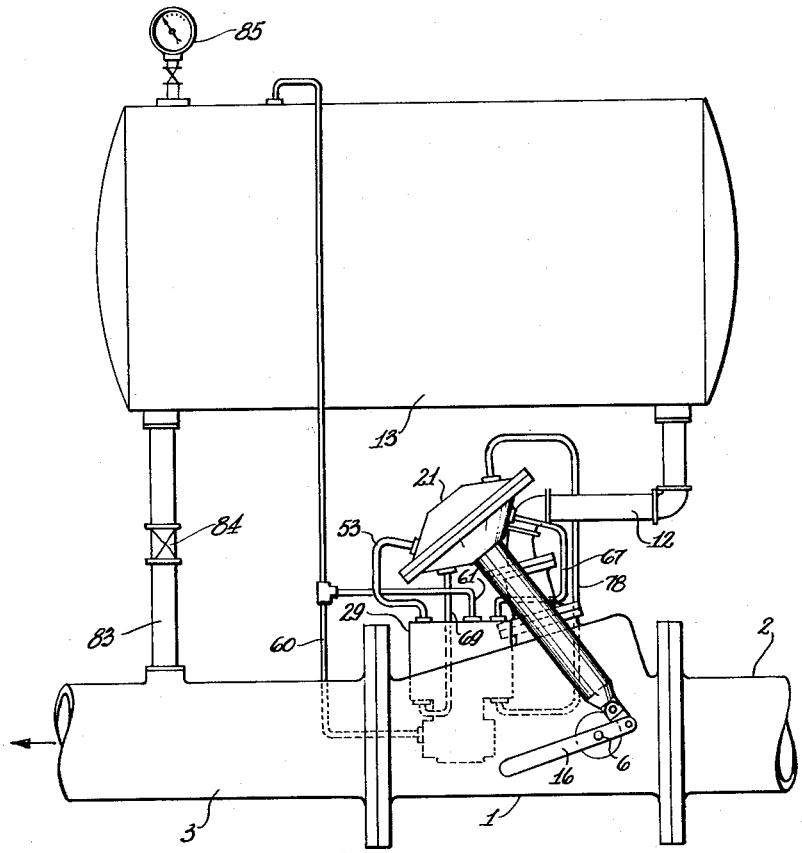
Figure 2:
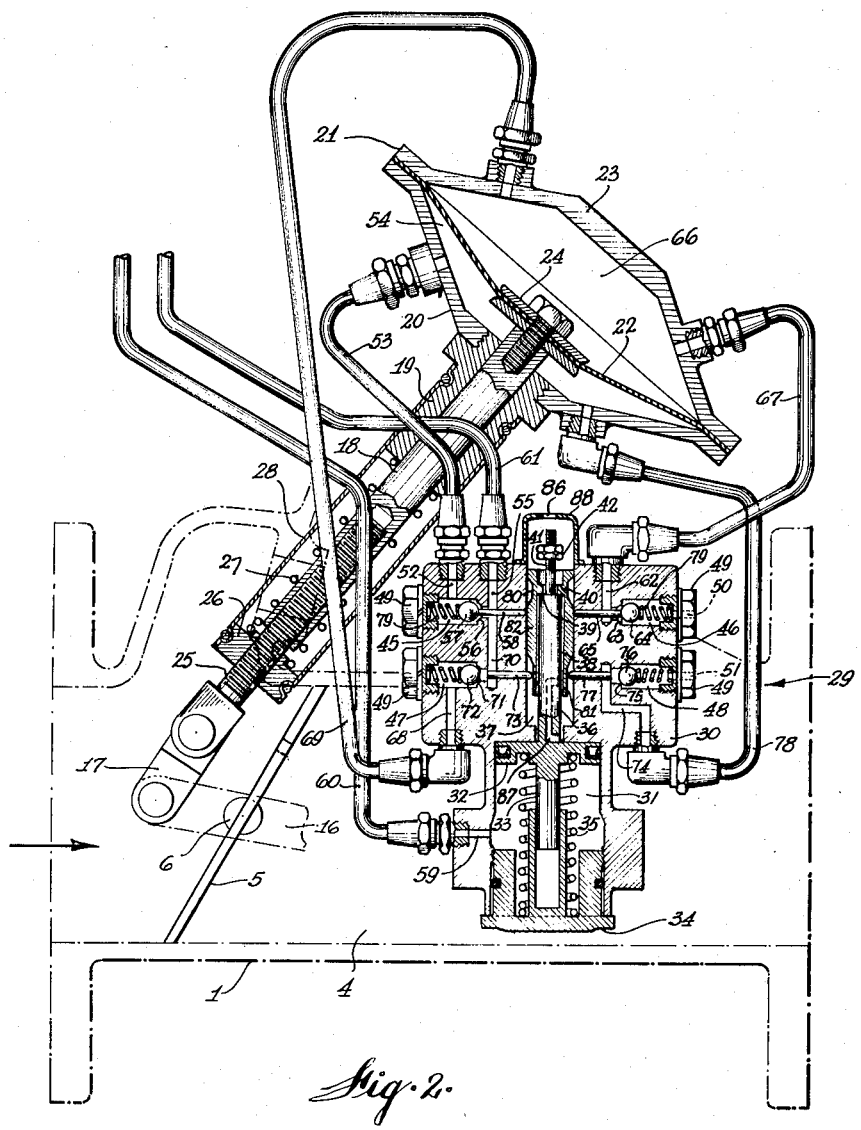
Figure 3:
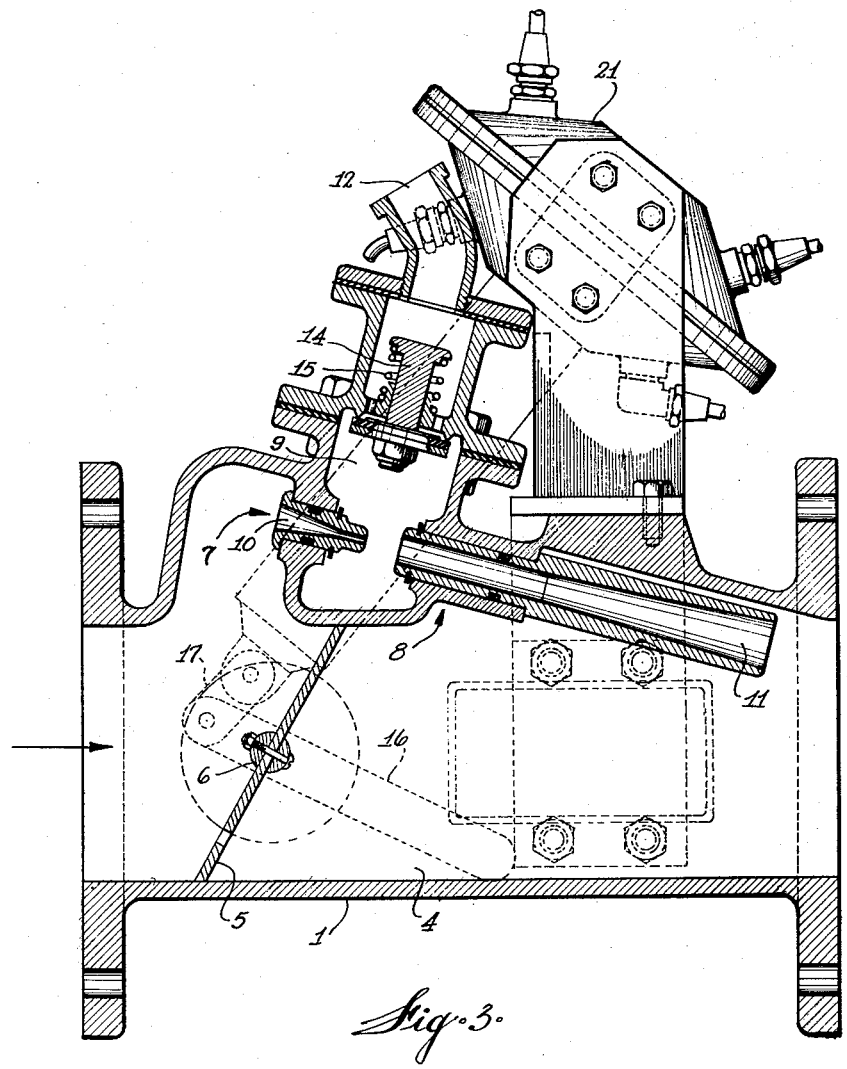

The invention will be described with reference to the accompanying drawings, in which Figure 1 is a side elevation of an apparatus in accordance with the invention, Figure 2 is an enlarged sectional side elevation of a valve mechanism forming part of the control device of the invention, and Figure 3 is an enlarged side elevation, partly in section, of the control device.

In the drawings, 1 is a control pipe section having its upstream end connected to a liquid supply pipe 2 and its downstream end connected to a liquid discharging or dispensing pipe 3. Pipe 2 is connected in a conventional manner through a hose or the like to a source of liquid such as aircraft fuel under pressure. Pipe 3 is connected to a suitable liquid dispensing line or hose (not shown).

Pipe section 1 has a main passage 4 controller by a butterfly or like valve 5 mounted on spindle 6 and an auxiliary passage 7 constituting part of an eductor 8 having a chamber 9, pressure inlet 10, and discharge venturi tube 11. Eductor chamber 9 is connected by pipe 12 to a tank 13, in which vacuum is to be maintained, through a non-return valve 14 having a spring 15 which permits flow from the tank 13 to the eductor chamber but not in the reverse direction. It will be apparent that, with valve 5 closed, liquid flow through pipe section 1 will be through the eductor 8 which will create a pressure drop in chamber 9, thus opening valve 14 and sucking air and/or liquid from tank 13 for discharge through tube 11. A vacuum will thereby be produced in tank 13.

Means for controlling operation of valve 5 comprises an arm 16 fixed to spindle 6 and pivotally connected through a link 17 to one end of a rod 18 reciprocally mounted in a member 19 fixed to one wall section 20 of a diaphragm housing 21. A diaphragm 22 is mounted in housing 21 between wall section 20 and a second wall section 23. The other end of rod 18 is axially fixed to the diaphragm 22 as by means of a mounting 24.

As shown, the connection between link 17 and rod 18 comprises a screw-threaded end portion 25 of the rod. Portion 25 also carried thereon a disc 26 and interposed between disc 26 and the adjacent end surface of member 19 is a compression spring 27. It will be apparent that movement of the rod 18 downwardly will act to close valve 5 and that spring 27 will urge the rod in such direction, while upward movement of the rod against the action of spring 27 will act to open valve 5. A resilient tube 28 may be provided to enclose the rod 18 and spring 27.

A main control valve is generally indicated at 29 and comprises a body 30 having a cylinder 31 in which is reciprocally mounted a piston 32 on piston rod 33. Cylinder 31 has an end cap 34 between which and the piston is interposed a compression spring 35 which urges the piston in an upward direction. End cap 34 has a screw-threaded mounting on body 30 whereby the compression of spring 35 may be adjusted as required. Cylinder 31 below piston 32 is in communication with vacuum tank 13 by means of passage 59 and conduit 60.

Piston rod 33 has an upwardly directed portion 36 extending into a cylindrical chamber 37 in body 30. A generally cylindrical cam member 38 is reciprocally mounted in chamber 37. Piston rod portion 36 extends axially through cam member 38 and is arranged to impart reciprocal movement to the cam is one direction by engagement of an annular shoulder 39 on the piston rod with a complementary annular shoulder 40 on the cam. Shoulder 39 is provided by a reduced diameter section 41 of piston rod portion 36 and on this section 41 is provided an axially adjustable annular shoulder 42, shown as a pair of superposed nuts engaging a threaded section of section 41 for engagement with shoulder 40 to effect reciprocal movement of the cam in the opposite direction. Shoulder 42 is spaced from shoulder 39 a distance such that, when shoulders 39 and 40 are in engagement, piston 32 and piston rod portion 36 must move downwardly a predetermined distance before shoulders 42 and 40 engage each other to impart reciprocal movement to the cam. A cap 88 provides a cover for the end of section 41. The upper side of piston 32 is exposed to atmosphere as, for instance, by means of a passage 87 in piston rod portion 36 and an opening 86 in cap 88, sufficient clearance being provided between piston rod portion 36 and its section 41 and the complementary surfaces of body 30 and cam 38 to permit passage of air.

Axially aligned valve chambers 45, 46 and 47, 48 are provided in valve body 30, with their axes normal to and intersecting the axis of chamber 37. As shown, chambers 45, 46 and 47, 48 are on opposite sides of the axis of chamber 37. Each chamber has a closure cap 49, chambers 46 and 48 being open to atmosphere through respective openings 50 and 51 in the closure caps thereof.

A passage 52 in body 30 communicates with valve chamber 45 and a conduit 53 connected to passage 52 places chamber 45 in constant communication with diaphragm chamber 54 on the lower side of diaphragm 22. A passage 55 in body 30 communicates with the inner end of chamber 45, such passage being provided with a valve seat 56 for engagement by the head of a poppet valve 57, the spindle 58 of which extends to chamber 37 for engagement by the cam member 38. Passage 55 is in communication with vacuum tank 13 by means of a conduit 61 and conduit 60. Thus, valve chamber 45 is in valve controlled communication with vacuum tank 13.

A passage 62 in body 30 communicates with the inner end of chamber 46, such passage being provided with a valve seat 63 for engagement by the head of a poppet valve 64, the spindle 65 of which extends to chamber 37 for engagement by the cam member 38. Passage 62 is in communication with the diaphragm chamber 66 on the upper side of diaphragm 22 by means of a conduit 67.

A passage 68 in body 30 communicates with valve chamber 47 as by means of a conduit 69 with the diaphragm chamber 66. A passage 70 in body 30 communicates with the inner end of chamber 47, such passage being provided with a valve seat 71 for engagement by the head of a poppet valve 72, the spindle 73 of which extend to the chamber 37 for engagement by the cam member 38. Passage 70 communicates with passage 55 and thus with vacuum tank 13.

A passage 74 in body 30 communicates with the inner end of chamber 48, such passage being provided with a valve seat 75 for engagement by head of a poppet valve 76, the spindle 77 of which extends to the chamber 37 for engagement by the cam member 38. Passage 74 is in communication with diaphragm chamber 54 by means of conduit 78.

A spring 79 is provided in each chamber 45, 46, 47, 48 for engagement with a respective one of spindles 58, 65, 73 and 77 to urge it into valve seating position.

Cam 38 has an upper reduced diameter section 80, a lower reduced diameter section 81, and an intermediate full diameter section 82 in engagement with the wall of chamber 37. It will be apparent that the ends of valve spindles 58, 65, 73 and 77 will engage one or other of the surfaces of cam sections 80, 81 and 82.

It will be observed that, with the piston 32 in its uppermost position under the influence of spring 35, and cam 38 at the termination of its upward stroke (as shown in Figure 2), valves 57 and 64 will be opened by engagement of their spindles with cam section 82 and valves 72 and 76 will be closed by release of their spindles as permitted by the cam section 81. When vacuum is applied to cylinder 31, piston 32 will move downwardly but because of the lost motion connection previously described, the initial portion of its downward stroke will not impart movement to the cam 38. However, on engagement of shoulder 42 with shoulder 40 cam 38 will commence its downward stroke under the influence of piston 32 and will continue until the end of cam 38 engages the adjacent end wall of cylinder 31 to define the termination of the downward stroke of cam 38. In this position of the cam, valves 57 and 64 will close when their spindles are permitted to move inwardly by cam section 80, and valves 72 and 76 will be opened by engagement of their spindles by cam section 82. It will be apparent that a reverse action of piston 32 and cam 38 will take place under the influence of spring 35 when vacuum ceases to be applied to cylinder 31.

It will be apparent that with the valves 57 and 64 open and valves 72 and 76 closed under the action of cam 38 (as shown in Figure 2), diaphragm chamber 54 will be in communication with vacuum tank 13 through conduit 53, passage 52, valve 57, passage 55 and conduit 61 while diaphragm chamber 66 will be subjected to atmospheric pressure through conduit 67, passage 62, valve 64, and opening 50. Thus, diaphragm 22 and rod 18 will move downwardly to close valve 5 spring 27 also acting to bias the valve in the closing direction.

When the cam 38 completes its downward stroke, as described, valves 57 and 64 are closed and valves 72 and 76 opened. Thus, diaphragm chamber 54 is subjected to atmospheric pressure through conduit 78, passage 74, valve 76 and opening 51 while diaphragm chamber 66 will be subjected to vacuum through conduit 69, passage 68, valve 72, passages 70 and 55, conduit 61 and vacuum tank 13. Thus, diaphragm 22 and rod 18 will move upwardly and open valve 5.

In the modification shown, in the closed position of the valve 5, the spindles of valves 57 and 64 are located substantially at the line of juncture of cam sections 80 and 82, while the spindles of valves 72 and 76 are in spaced relation to the line of juncture of cam sections 81 and 82. Thus, on downward movement of cam 38, valves 57 and 64 will be closed during the initial portion of its downward stroke and in advance of opening of valves 72 and 76 which takes place during the last portion of the downward stroke of the cam.

The downstream pipe 3 is connected to the vacuum tank 13 by a suction withdrawal pipe 83 provided with a control valve 84. Tank 13 may be provided with a pressure gauge 85.

In operation, assuming that the parts of the control device are as shown in Figure 2, valve 5 being closed under the action of spring 27 and any vacuum existing in tank 13 and piston 32 and cam 38 being in their uppermost positions under the action of spring 35. Now, with liquid under pressure flowing through pipe 2, pipe section 1, and pipe 3, the liquid will flow through the eductor 8 to produce a higher vacuum in tank 13.

When a predetermined degree of vacuum is present in tank 13, piston 32 will move downwardly and, following an initial portion of its downward stroke as previously described, it will impart a downward stroke to the cam 38. As a result, diaphragm 22 and rod 18 will move upwardly in the manner heretofore described to open valve 5. Thus, liquid will flow through the main passage in pipe section 1 with only a minor quantity flowing through the eductor. However, non-return valve 14 will serve to maintain a desired degree of vacuum in tank 13.

When the dispensing operation has been completed, the supply of liquid under pressure is shut off and the valve 84 opened. Thus, the liquid in the supply lines or hoses will flow through pipe 83 into the tank 13 because of the suction created by the vacuum in such tank. As a result, no liquid under pressure remains in the supply lines or hoses thereby facilitating the handling thereof. For instance, the hoses (if they are of the collapsible type) may be readily collapsed and placed on reels.

The subsequent dispensing operation will cause the liquid in tank 13 to be initially dispensed under the action of the eductor 8.

The control device described permits a predetermined degree of vacuum to be retained in the vacuum tank after liquid is withdrawn from the dispensing lines. Thus, the time required to obtain a maximum degree of vacuum in the tank is greatly reduced with consequent reduction of time required for conducting the next dispensing operation.

Moreover, since the control device acts to apply a negative pressure to one side of the diaphragm and atmospheric pressure to the other side, positive operating action of the diaphragm is ensured to open or close the valve 5.

Such positive operating action is further promoted by the fact that a lost motion or slip connection is provided between the valve cam 38 and the piston 32 whereby the cam 38 is actuated only over the last portion of the stroke of the cam actuating piston 32. Consequently, the controlling valves 57, 64, 72, 76 are not actuated until there is a desired degree of vacuum present in the vacuum tank to ensure positive operation of the diaphragm and of the valve 5. While the extent of travel of the various portions of the piston and cam strokes may vary, it has been found satisfactory if the piston actuates the cam only during the last half of its complete stroke.

For instance, with a ¾ inch stroke of the piston, the cam will be moved therewith only during the last ⅜ inch of such stroke. Moreover, in the modification shown, during the first half of the cam stroke, the valves 57 and 64 are closed while valves 72 and 76 remain closed, while during the second half of the cam stroke, the valves 72 and 76 are opened, valves 57 and 64 remaining closed.

The required vacuum in the tank 13 can be varied as desired by rotating the cylinder end cap 34 which will vary the compression of the spring 35 and thus the degree of vacuum required to move piston 32.

It will be appreciated that the spring 35 may be readily removed by removing the end cap 34 and another spring substituted therefor. Therefore, if the entire range of vacuum requires to be changed to suit any special dispensing equipment, this chan be achieved simply by substituting an appropriate spring for the spring 35.

The spring 27 on the diaphragm rod 18 ensures that the valve 5 remains closed when initially starting the system or when the vacuum becomes lost as may be the case after the equipment has been idle for some time.

The main control valve 29 ensures that the valve 5 remains closed until the desired vacuum is obtained, thus eliminating the possibility of a partially open valve 5 which decreases the efficiency of the eductor and results in a prolonged dispensing operation.

I claim:

1. A control device for liquid dispensing and withdrawing apparatus having a liquid supply passage, a vacuum tank, a main valve in said passage, and liquid flow-operated means for producing a vacuum in said tank, which comprises a reciprocally mounted rod connected to said main valve and operable to open and close said valve, a pressure responsive member connected to said rod for imparting reciprocal movement thereto, a housing for said pressure responsive member and means providing a differential pressure on opposite sides of said pressure responsive member comprising a control valve having a body, a pair of valve chambers in said body, a conduit connecting each of said chambers with said vacuum tank, a conduit connecting one of said chambers with said housing on one side of said pressure responsive member, a conduit connecting the other of said chambers with said housing on the other side of said pressure responsive member, a second pair of valve chambers in said body, each of said second valve chambers being open to atmosphere, a conduit connecting one of said second chambers to said housing on one side of said pressure responsive member, a conduit connecting the other of said second chambers to said housing on the other side of said pressure responsive member, a valve in each of said chambers controlling flow through said conduits, a cam reciprocally mounted in said body for actuating said valves, and piston and cylinder means responsive to vacuum on said vacuum tank for reciprocating said cam.

2. A control device for liquid dispensing and withdrawing apparatus having a liquid supply passage, a vacuum tank, a main valve in said passage, and liquid flow-operated means for producing a vacuum in said tank, which comprises a reciprocally mounted rod connected to said main valve and operable to open and close said valve, a pressure responsive member connected to said rod for imparting reciprocal movement thereto, a housing for said pressure responsive member and means providing a differential pressure on opposite sides of said pressure responsive member comprising a control valve having a body, a pair of valve chambers in said body open to atmosphere, a conduit connecting each of said valve chambers to said housing one on each side of said pressure responsive member, a second pair of valve chambers in said body, a conduit connecting said second valve chambers to said vacuum tank, a conduit connecting each of said second valve chambers to said housing one on each side of said pressure responsive member, a valve in each of said chambers for controlling flow through said conduit, each said valve having an actuating spindle, a cam reciprocally mounted in said body and engageable with said spindles to actuate said valves, a cylinder in said body, a piston reciprocally mounted in said cylinder and having a rod connected to said cam to impart reciprocal movement thereto, a spring urging said piston in one direction of movement, and a conduit connecting said cylinder to said vacuum tank for application of vacuum to said cylinder to move said piston in the other direction.

3. A control device for liquid dispensing and withdrawing apparatus as defined in claim 2, said piston rod having a slip connection with said cam whereby said piston imparts movement to said cam only following initial movement of said piston.

References Cited in the file of this patent
UNITED STATES PATENTS 1,441,651 Anderson et al. _____ Jan. 9, 1923